United States Patent
Aoyama

(10) Patent No.: US 6,176,003 B1
(45) Date of Patent: Jan. 23, 2001

(54) METHOD AND APPARATUS FOR MANUFACTURING MOLDING

(75) Inventor: Yoshihiro Aoyama, Oobu (JP)

(73) Assignee: Tokai Kogyo Kabushiki Kaisha, Oobu (JP)

(*) Notice: Under 35 U.S.C. 154(b), the term of this patent shall be extended for 0 days.

(21) Appl. No.: 09/011,196

(22) PCT Filed: Jun. 23, 1997

(86) PCT No.: PCT/JP97/02166
 § 371 Date: Feb. 18, 1998
 § 102(e) Date: Feb. 18, 1998

(87) PCT Pub. No.: WO98/00282
 PCT Pub. Date: Jan. 8, 1998

(30) Foreign Application Priority Data

Jun. 28, 1996 (JP) .................................................. 8-188436

(51) Int. Cl.[7] .................................................... B32B 15/04
(52) U.S. Cl. .................................. 29/527.4; 264/171.14; 264/171.15; 425/381; 425/465; 425/466
(58) Field of Search ...................... 29/527.4; 264/171.14, 264/171.15, 171.22; 425/465, 466, 381

(56) References Cited

U.S. PATENT DOCUMENTS 3,239,402 * 3/1966 Ecklund et al. ................. 264/171.14

FOREIGN PATENT DOCUMENTS

| 57-14100 | * 1/1982 | (JP) . |
| 5-201247 | * 8/1993 | (JP) . |
| 5-305644 | * 11/1993 | (JP) . |

* cited by examiner

Primary Examiner—P. W. Echols
(74) Attorney, Agent, or Firm—Oblon, Spivak, McClelland, Maier & Neustadt, P.C.

(57) ABSTRACT

A method of manufacturing the molding 1 comprising a forming process of preparing a molded material 100 which is used as a core metal 10 and has a uniform sectional configuration by forming a material of the core metal 10 into a predetermined configuration; a cut-off process of cutting off a part of the molded material 100 to prepare the core metal 10 whose sectional configuration is varied; and an extrusion process of variably extruding the synthetic resin 19 onto a surface of the core metal 10 by moving a movable die 41 according to the sectional configuration of the core metal 10, using an extruding die body 40 and the movable die 41 installed on the die body 40.

According to this method, the adherence of the synthetic resin to the core metal can be reliably accomplished, and thus the molding-manufacturing method having a high productivity can be provided.

9 Claims, 5 Drawing Sheets

METHOD AND APPARATUS FOR MANUFACTURING MOLDING

TECHNICAL FIELD

The present invention relates to a method and an apparatus for manufacturing a molding comprising a core metal and synthetic resin coating the core metal and having a varied sectional configuration.

BACKGROUND ART

Generally, moldings such as a window molding, a door outer molding, and the like are installed on a vehicle. The window molding is installed along the boundary between a pillar and a window glass. Likewise, the door outer molding is installed along the boundary between a door and a door glass.

In recent years, in order to improve rainwater-removing performance and appearance, a molding whose sectional configuration is changed lengthwise has been used.

As an example of the above-described molding, as shown in FIG. 4, a molding 9 comprising a core metal 90 and synthetic resin 19 coating a surface of the core metal 90 is known. The core metal 90 comprises an installing portion 11; an outer strip 13 whose height is changed lengthwise; and a ceiling portion 12 connecting both with each other.

Conventionally, the molding is manufactured as described below. First, the core metal 90 whose sectional configuration is uniform is formed.

Then, synthetic resin is extruded onto the surface of the core metal 90 to obtain a coated material 99 whose sectional configuration is uniform, as shown in FIG. 5. Then, using a cutter, the coated material 99 is cut to obtain the molding 9. At this time, in conformity to the configuration of the molding 9, a part of the outer strip 13 of the core metal 90 and the synthetic resin 19 coating the surface of core metal 90 are cut off from the molding 9.

In this manner, the molding 9 as shown in FIG. 4 is obtained.

Reference numeral 909 shown in FIG. 4 denotes a cut portion formed as a result of the above-described cut-off.

However, the above-described conventional manufacturing method has problems which are described below.

First, in the above-described cut-off, the core metal 90 is cut off together with the synthetic resin 19 coating the surface of the core metal 90. Therefore, it is difficult to obtain a smoothed cut portion 909.

Further, heat is generated in the cut-off and the synthetic resin 19 may attach to the cutter. Due to the attachment of the synthetic resin 19 to the cutter, the cutting performance of the cutter deteriorates and it is more and more difficult to obtain the smoothed cut portion 909.

Further, in the cut-off, the synthetic resin 19 may separate from the core metal 90 in the cutting portion 909.

Furthermore, the cut-off is carried out only after the synthetic resin 19 is completely hardened on the surface of the core metal 90. Thus, it takes long to manufacture the molding 9 and hence the productivity is unfavorable.

In view of the above-described problems, it is an object of the present invention to provide a method and an apparatus, for manufacturing a molding, capable of securing the adhesion of synthetic resin to a core metal and having a superior productivity.

DISCLOSURE OF THE INVENTION

According to the invention of claim 1, a method for manufacturing a molding comprising synthetic resin and a core metal whose periphery is coated with the synthetic resin by extrusion and having a varied sectional configuration, comprising:

a forming process of preparing a molded material which is used as a core metal and has a uniform sectional configuration by forming a material of the core metal into a predetermined configuration;

a cut-off process of cutting off a part of the molded material to prepare the core metal whose sectional configuration is varied; and an extrusion process of variably extruding the synthetic resin onto a surface of the core metal by moving a movable die installed on an extruding die body according to a sectional configuration of the core metal, using the extruding die body and the movable die.

The operation of the present invention is described below.

In the manufacturing method and the manufacturing apparatus of the present invention, the molded material which is used as the core metal and has the uniform sectional configuration is partly cut according to the configuration of a molding to form the core metal, and then, the synthetic resin is extruded onto the core metal, according to the sectional configuration of the metal core by using the movable die.

Therefore, the cut-off process consists of an operation of cutting off an unrequited portion from the molded material to be used as the core metal, and thus the removal of the unrequired portion is facilitated.

Further, after the unrequited portion is cut off from the molded material to be used as the core metal, the synthetic resin is extruded onto the core metal. Therefore, the adherence of the synthetic resin to the core metal can be reliably accomplished.

Furthermore, the forming of the molded material to be used as the core metal, the removal of a part thereof, and the extrusion of the synthetic resin can be consecutively carried out. Thus, the manufacturing method of the present invention is highly productive and effective.

Further, because the molded material which is used as the core metal has the uniform sectional configuration, the forming thereof can be accomplished easily. Therefore, according to the present invention, the molded material which is used as the core metal and has a high size accuracy can be obtained. In addition, in forming the molded material to be used as the core metal, few defective goods are produced.

Furthermore, the core metal having the predetermined sectional configuration is obtained by cutting the unrequited portion from the molded material to be used as the core metal. Thus, the degree of the design freedom of the sectional configuration of the core metal is high, and hence the molding having a desired configuration can be easily manufactured.

As described above, according to the present invention, the adherence of the synthetic resin to the core metal can be reliably accomplished and thus a molding-manufacturing method having a high productivity can be provided.

As the synthetic resin, polyvinyl chloride, ionomer resin, synthetic rubber, and the like can be used.

As the material of the core metal, steel plates, stainless steel plates, aluminum plates, and the like can be used.

As described in claim 2, it is preferable that the unrequired portion is cut off from the molded material to be used as the core metal by using a laser.

This method allows the core metal to be processed with high accuracy.

As the laser beam oscillator, the use of a gas laser and a solid laser are conceivable, but it is preferable to utilize the solid laser which is compact.

As described in claim 3, it is preferable that the molded material to be used as the core metal comprises an installing portion, an outer strip, and a ceiling portion connecting both with each other; and in the cut-off process, a part of the molded material to be used as the core metal is cut off such that the height of the outer strip is varied.

This method and construction allows the provision of the molding whose configuration is varied according to the layout of a vehicle body or a window glass or the like and the change in the configuration thereof and which can be installed thereon easily and has a fine appearance.

The molded material to be used as the core metal is formed according to the configuration of the core metal to be obtained, and a portion which is cut off from the molded material to be used as the core metal is selected according to the configuration of the core metal.

As described in claim 4, it is preferable that in the extrusion process, the synthetic resin is applied to the surface of a cut end of the core metal as well as the surface of the entire core metal.

This method prevents the cut end from being exposed to the outside. Thus, the core metal can be prevented from being corroded and rusted.

The cut end means a sectional surface formed as a result of the cutting of the molded material to be used as the core metal in the cut-off process (see FIG. 1).

As described in claim 5, it is preferable that the cut-off, the removal, and the extrusion are consecutively performed while the core metal is being moved lengthwise.

This method enhances the productivity of the molding.

In this case, because the molded materials to be used as the core metals are successively moved, the cut-off means of the cut-off device is moved in only the height direction of the core metal.

Thus, the control of the cut-off means can be easily accomplished.

According to the invention of claim 6, an apparatus for manufacturing a molding comprising synthetic resin and a core metal whose periphery is coated with the synthetic resin by extrusion and having a varied sectional configuration, comprising:

a forming device for preparing the molded material which is used as the core metal and has a uniform sectional configuration by molding a material of the core metal into a predetermined shape;

a cut-off device of cutting off a part of the molded material to prepare the core metal whose sectional configuration is varied; and an extruding device having an extruding die body and a movable die installed on the extruding die body.

According to the manufacturing apparatus, the unrequired portion of the molded material which is used as the core metal and has a uniform sectional configuration and formed by the forming device is cut off to obtain the core metal, and synthetic resin is variably extruded according to the sectional configuration of the core metal by using the extruding device.

Therefore, the cut-off process consists of an operation of cutting off the unrequited portion from the molded material to be used as the core metal, and thus the removal of the unrequited portion is facilitated.

Further, after the unrequired portion is cut off from the molded material to be used as the core metal, the synthetic resin is variably extruded onto the core metal. Therefore, the adherence of the synthetic resin to the core metal can be reliably accomplished.

Furthermore, the forming of the molded material to be used as the core metal, the removal of a part thereof, and the extrusion of the synthetic resin can be consecutively carried out. Thus, the manufacturing method of the present invention is highly productive and effective.

Moreover, in the extruding device, the movable die is positioned in confrontation with the extrusion port from which the synthetic resin is extruded. By moving the movable die, the configuration of the extrusion port is changed corresponding to the configuration of the core metal whose sectional configuration is changed.

This construction allows the synthetic resin to be variably extruded onto the surface of the core metal.

As apparent from the above description, according to claim 6, the adherence of the synthetic resin to the core metal can be reliably accomplished, and thus the molding-manufacturing method having a high productivity can be provided.

As described in claim 7, it is preferable that a cut-off means of the cut-off device consists of a laser.

This provides an effect similar to that obtained from the method described in claim 2.

As described in claim 8, it is preferable that the molded material to be used as the core metal comprises an installing portion, an outer strip, and a ceiling portion connecting both with each other; and that the cut-off device has a cut-off means for cutting off a part of the molded material to be used as the core metal such that the height of the outer strip is varied.

This provides an effect similar to that obtained from the method described in claim 3.

As described in claim 9, it is preferable that the cut-off device and the movable die comprise interlocking control means which allow said cut-off device and said movable die to interlock by controlling each other.

The interlocking control means enables the movable die to move accurately in correspondence to the configuration of the cut portion of the molded material to be used as the core metal. Thus, in accurate conformity to the configuration of the core metal, the synthetic resin can be variably extruded and thus the size accuracy of the molding can be enhanced.

Further, it is preferable that the cut-off device and the movable die hold a common interlocking control means. Namely, the interlocking control means are unified thereof, and thus the apparatus for manufacturing the molding can be allowed to be compact. In addition, in manufacturing a plurality of kinds of moldings, the setting operation of the control means is performed only once. Thus, an efficient operation can be accomplished by the provision of the interlocking control means.

As the interlocking control means, a control means utilizing a computer can be used.

It is possible to use control means for controlling the cut-off means and another control means for controlling the movable die.

DESCRIPTION OF REFERENCE NUMERALS

Figure 1:
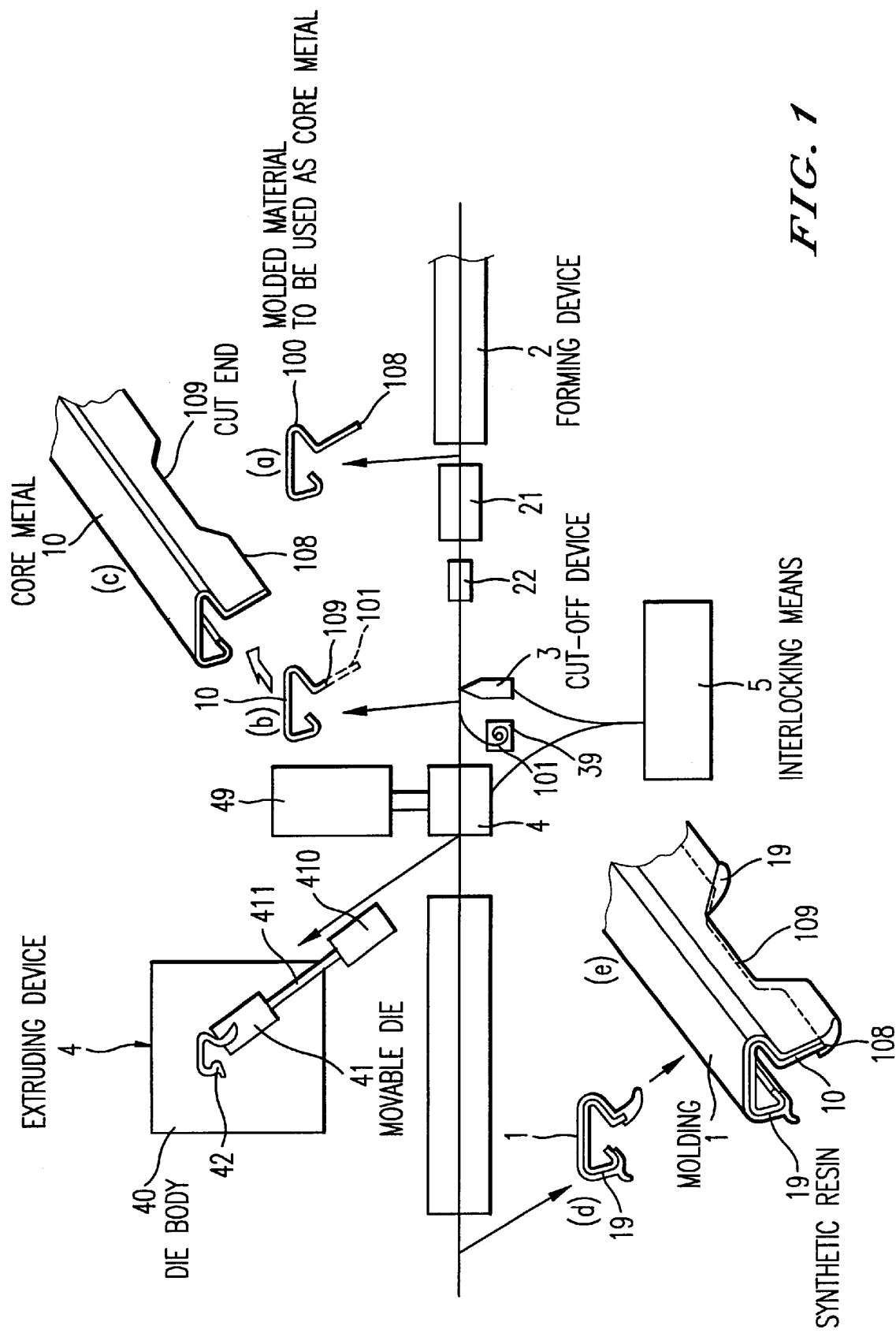
FIG. 1 is an explanatory view showing an apparatus of manufacturing a molding and a method of manufacturing the molding according to an embodiment.

1: molding
10: core metal
100: molded material to be used as core metal
109: cut end
11: installing portion
12: ceiling portion
13: outer strip
2: forming device
3: cut-off device
4: extruding device
40: die body
41: movable die
5: interlocking means

BEST MODE FOR CARRYING OUT THE INVENTION

Embodiment

A method for manufacturing a molding; and an apparatus for manufacturing the molding; and the molding obtained thereby according to an embodiment of the present invention will be described below with reference to FIG. 1 through FIG. 3.

Figure 3:
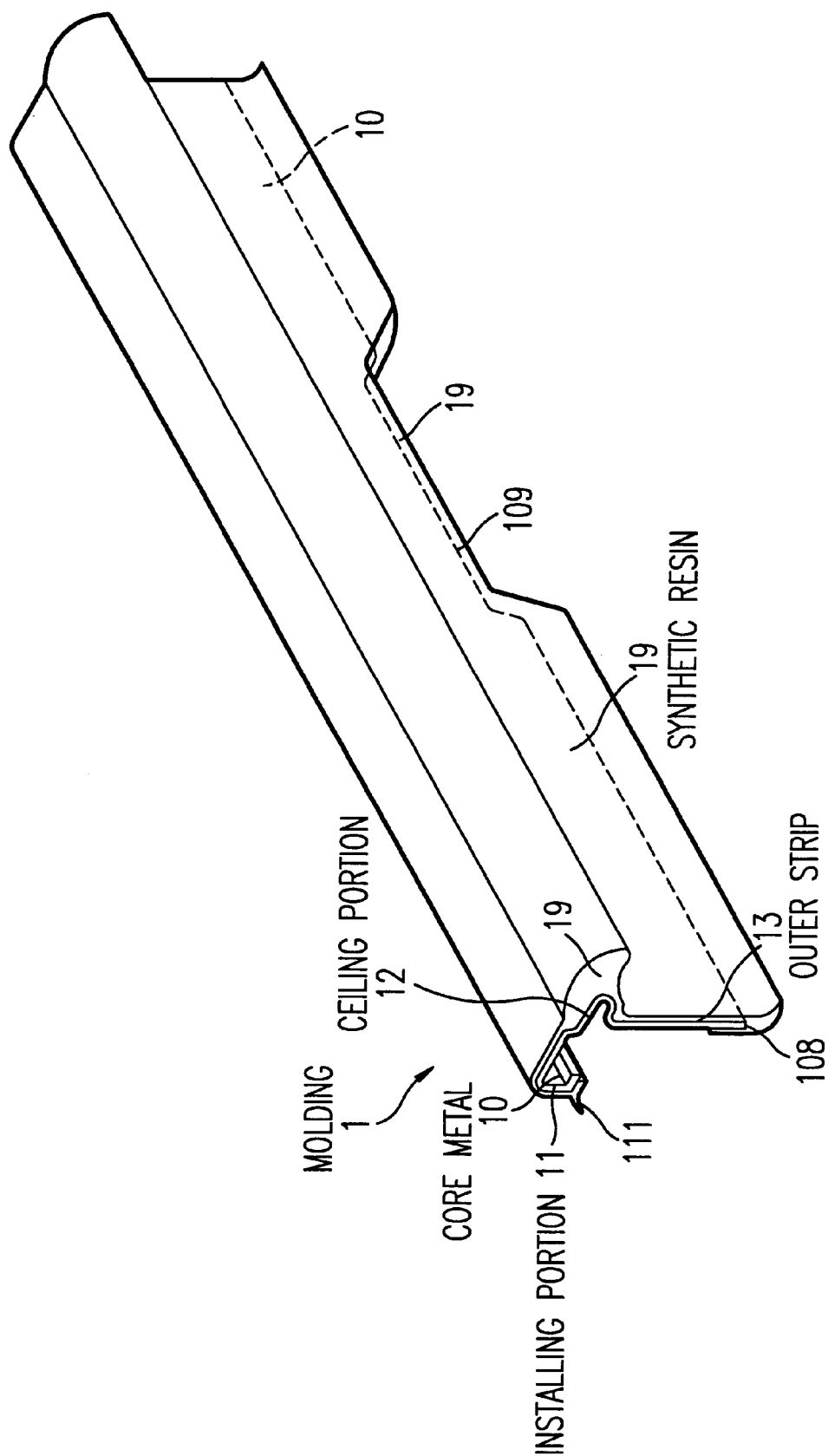
FIG. 3 is a perspective view showing a molding according to an embodiment.
Figure 4:
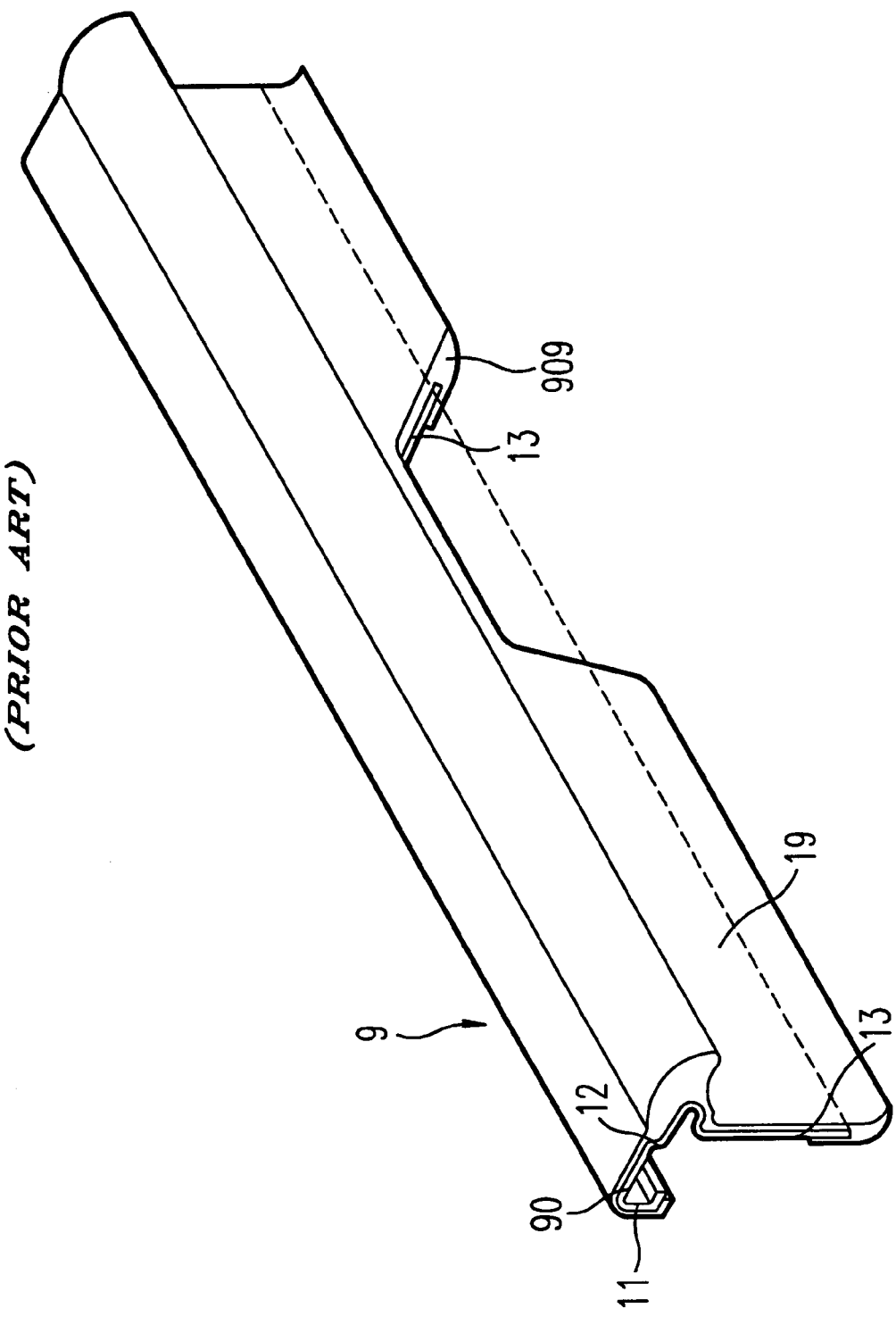
FIG. 4 is a perspective view showing a conventional molding.
Figure 5:
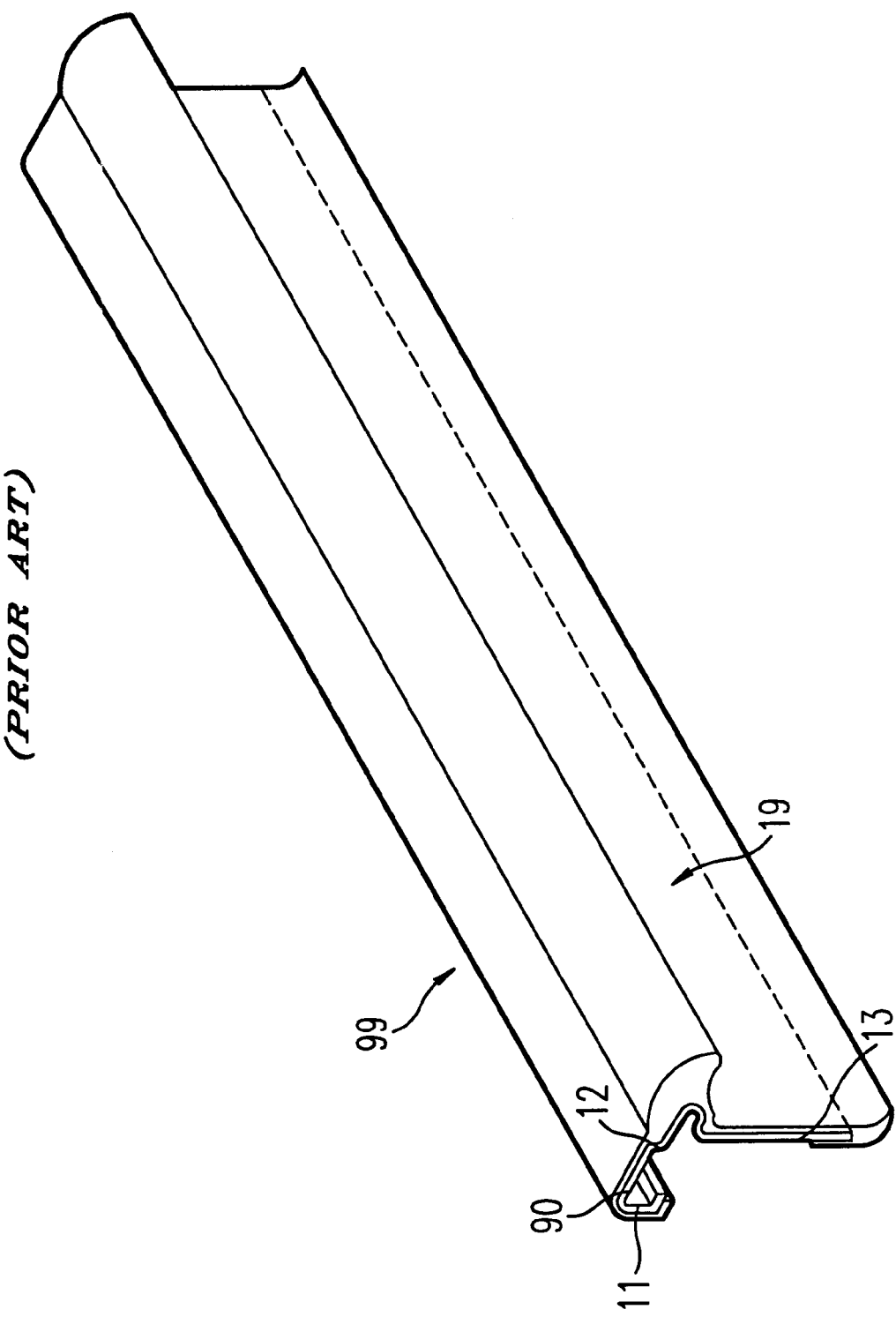
FIG. 5 is a perspective view showing a conventional coated material.

As shown in FIG. 3, a molding 1 of the embodiment comprises synthetic resin 19 and a core metal 10 whose periphery is coated with the synthetic resin 19 by extrusion. The sectional configuration of the molding 1 is varied.

As shown in FIG. 1, the method of manufacturing the molding 1 comprises a forming process of preparing a molded material 100 which is used as a core metal 10 and has a uniform sectional configuration by forming a material of the core metal 10 into a predetermined configuration; a cut-off process of cutting off a part of the molded material 100 to prepare the core metal 10 whose sectional configuration is varied; and an extrusion process of variably extruding the synthetic resin 19 onto a surface of the core metal 10 by moving a movable die 41 according to the sectional configuration of the core metal 10, using an extruding die body 40 and the movable die 41 installed on the die body 40.

The molding 1 will be described in detail below.

As shown in FIG. 3, the molding 1 is approximately L-shaped in section and comprises an installing portion 11; an outer strip 13; and a ceiling portion 12 connecting both with each other. The height of the outer strip 13 is partly varied.

An end of the installing portion 11 is bent toward the inner side of the molding 1. A lip 111 made of the synthetic resin 19 is provided on an outer surface of the installing portion 11.

In the outer strip 13, the synthetic resin 19 is applied to the inner surface of the molding 1 beyond a cut end portion 109 and thus, the cut end portion 109 is not exposed to the outside.

The apparatus for manufacturing the molding 1 will be described below.

As shown in FIG. 1, the manufacturing apparatus comprises a forming device 2 for preparing the molded material 100 which is used as the core metal 10 and has a uniform sectional configuration by molding a material of the core metal 10 into a predetermined shape; a cut-off device 3 of cutting off a part of the molded material 100 to prepare the core metal 10 whose sectional configuration is varied; and an extruding device 4 having the extruding die body 40 and the movable die 41 installed on the die body 40.

The forming device 2 is described below.

As shown in FIG. 1, the forming device 2 is a device for forming a core metal material such as a steel plate into the molded material 100 which is used as the core metal 10 and has a uniform sectional configuration.

The apparatus for manufacturing the molding 1 has an adhesive agent-applying device 21 and a heater 22 installed adjacently to and behind the forming device 2.

The cut-off device 3 comprises a cutting means for cutting off a part of the molded material 100 to be used as the core metal 10 and a removing device 39 for removing a cut-off unrequited portion 101. The operation of the cut-off device 3 and that of the extruding device 4 are controlled by an interlocking control means 5.

Figure 2:
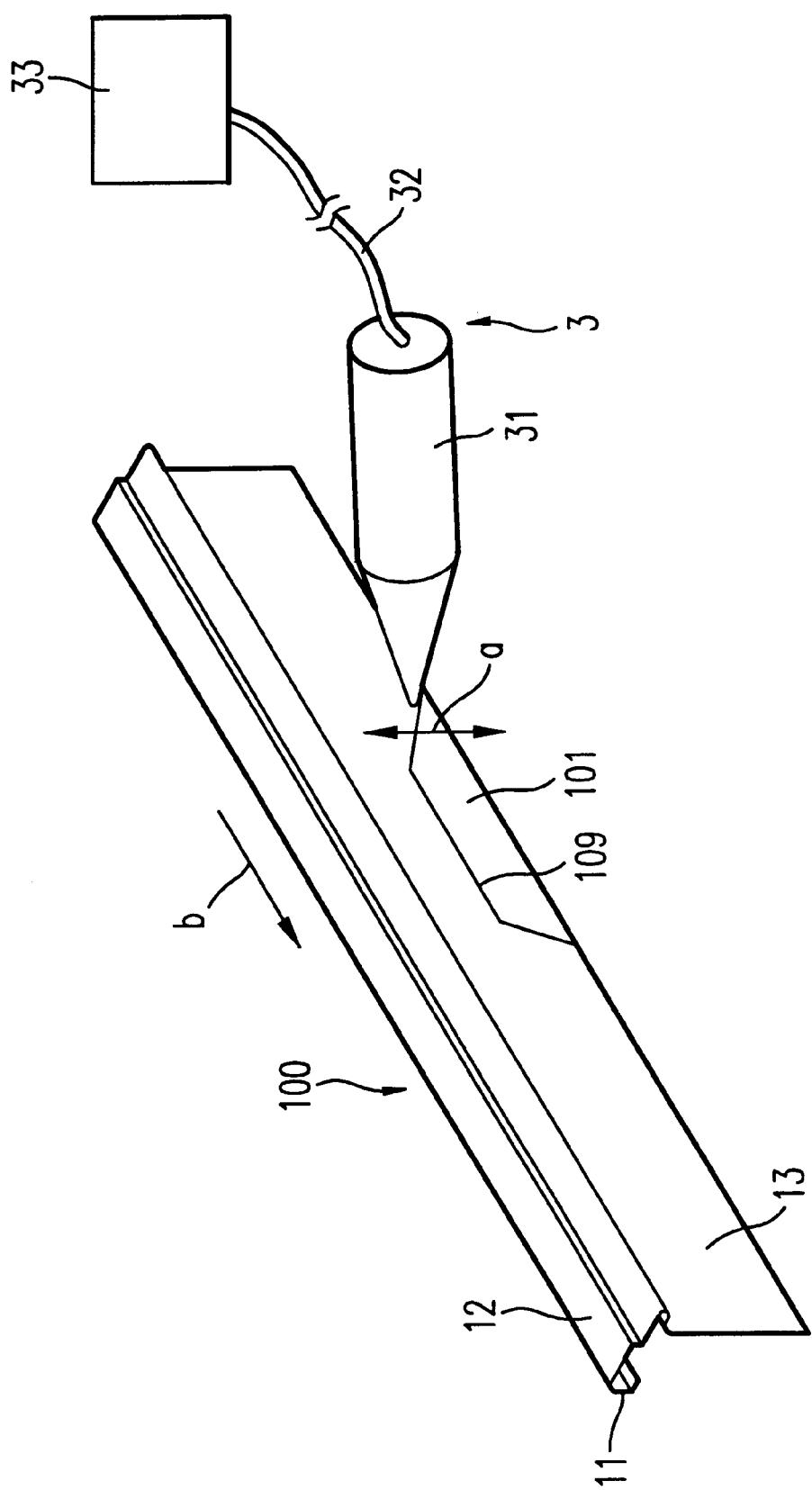
FIG. 2 is an explanatory view showing a process of cutting off an unrequired portion from a molded material to be used as a core metal according to an embodiment.

As shown in FIG. 2, the cut-off device 3 consists of a laser comprising a solid laser beam oscillator 33; an optical fiber 32 for transmitting laser beams oscillated by the laser oscillator 33 to a laser head 31; and the laser head 31 for projecting the laser beams on the molded material 100 to be used as the core metal 10.

The laser head 31 is movable upward and downward relative to the molded material 100 to be used as the core metal 10 (see an arrow (a) in FIG. 2).

The extruding device 4 comprises an extruder 49 for extruding the synthetic resin 19; an extrusion port 42 communicating with the extruder 49; the die body 40 on which the extrusion port 42 is installed; and the movable die 41 constituting a part of the extrusion port 42.

The operation of the movable die 41 and that of the cut-off device 3 are controlled by the interlocking control means 5.

A concave (not shown) communicating with the extrusion port 42 is provided inside the die body 40. The movable die 41 is provided by inserting it into the concave. Reference numeral 411 shown in FIG. 1 denotes a rod, and reference numeral 410 denotes a cylinder.

The apparatus for manufacturing the molding 1 further comprises a cooling water tank 46 which is adjacent to the extruding device 4 and cools and hardens the extruded synthetic resin 19.

The interlocking control means 5 which controls the cut-off device 3 and the extruding device 4 by interlocking both with each other is described below.

The interlocking control means 5 controls the upward and downward movement of the laser head 31, the supply and stop of laser beams; and the movement of the movable die 41. The interlocking control means 5 controls the movement of the movable die 41 with the elapse of a predetermined time after the cutting is carried out by the laser, according to the sectional configuration of the core metal 10.

The method of manufacturing the molding 1 is described in detail below.

First, as shown in FIG. 1, thin metal plates each of which has the same width and is used as the material of the core metal are continuously supplied to the forming device 2 to form each metal plate into the molded material 100 which is used as the core metal 10 and has a uniform sectional configuration, as shown in FIG. 1 (a) (forming process).

Then, the molded material 100 to be used as the core metal 10 is introduced into the adhesive agent-applying device 21 in which adhesive agent is applied thereto. Then, the molded material 100 to be used as the core metal 10 is introduced into the heater 22 to dry the adhesive agent.

The molded materials 100 to be used as the core metal 10 are continuously introduced into the cut-off device 3 to cut off the unrequired portion 101 by a laser, with the result that the core metal 10 shown in FIGS. 1 (b) and (c) is obtained (cut-off process). Then, as shown in FIG. 2, the unrequired portion 101 is cut off by moving the laser head 31 upward and downward as shown by the arrow (a) relative to the molded material 100 which is used as the core metal 10 and which continuously moves in a direction shown by an arrow (b). The unrequited portion 101 generated in this process is collected by the removing device 39.

Then, as described above, the core metals 10 processed into a desired sectional configuration are continuously introduced into the extrusion port 42 of the extruding device 4. Inside the extruding device 4, the movable die 41 moves along the lower end 108 and the cut end 109 of the outer strip 13 of the core metal 10. The interlocking control means 5 controls the operation of the movable die 41 so that the movable die 41 moves with the elapse of a predetermined time after the operation of the laser head 31 is performed.

That is, the operation of the movable die 41 is carried out by calculating the time at which the cut end 109 reaches the extrusion port 42 in relation to the time at which the operation of the laser head 31 is performed.

Then, an extruder 49 extrudes the synthetic resin 19 to the extrusion port 42. As a result, the synthetic resin 19 is extruded to the surface of the core metal 10. Then, the synthetic resin 19 is introduced into the cooling water tank 46 to cool and harden the synthetic resin 19 (extrusion process).

By the above-described process, the molding 1 shown in FIG. 1 (d), FIG. 1 (e), and FIG. 3 is obtained.

The operation and effect of the embodiment are described below.

In the manufacturing method and the manufacturing apparatus of the embodiment, the molded material 100 which is used as the core metal 10 and has the uniform sectional configuration is cut to form the core metal 10, and the synthetic resin 19 is extruded onto the core metal 10.

Therefore, the cut-off process consists of an operation of cutting off the unrequired portion 101 from the molded material 100 to be used as the core metal 10, and thus the cut-off and removal of the unrequired portion 101 can be facilitated.

Further, after the unrequired portion 101 is cut off from the molded material 100 to be used as the core metal 10, the synthetic resin 19 is extruded onto the core metal 10. Therefore, the adherence of the synthetic resin 19 to the core metal 10 can be reliably accomplished.

Furthermore, in the embodiment, the forming of the molded material 100 to be used as the core metal 10, the removal of a part thereof, and the extrusion of the synthetic resin 19 can be consecutively carried out. Thus, the manufacturing method of the present invention is highly productive and effective.

In addition, because the cutting of the molded material 100 to be used as the core metal 10 is performed by using the laser, the core metal 10 can be cut and processed with high accuracy.

Moreover, because the synthetic resin 19 is applied to the surface of the cut end 109 as well in the extrusion process, the cut end 109 can be prevented from being exposed to the outside. Thus, the core metal 10 can be prevented from being corroded and rusted.

Further, the interlocking control means 5 controls the operation of the laser head 31 and that of the movable die 41 by interlocking both with each other. Therefore, according to the manufacturing method of the embodiment, the molding 1 can be more efficiently manufactured.

APPLICABILITY IN INDUSTRY

As described above, according to the present invention, the adherence of the synthetic resin to the core metal can be reliably accomplished, and thus the molding-manufacturing method having a high productivity can be provided.

What is claimed is:

1. A method for manufacturing a molding comprising:

forming a core metal into a predetermined configuration, thereby producing a molded material having a uniform sectional configuration;

cutting off a part of the molded material to form a molded material having a varied sectional configuration; and variably extruding a synthetic resin onto a surface of the molded material having a varied sectional configuration by moving a movable die installed on an extruding die body according to the sectional configuration of the core metal, using the extruding die body and the movable die.

2. The method of manufacturing the molding according to claim 1, wherein an unrequired portion is cut off from the molded material to be used as the core metal, by using a laser.

3. The method of manufacturing the molding according to claim 1, wherein the molded material to be used as the core metal comprises an installing portion, an outer strip, and a ceiling portion connecting both with each other; and in the cut-off process, a part of the molded material to be used as the core metal is cut off such that the height of the outer strip is varied.

4. The method of manufacturing the molding according to claim 1, wherein in the extrusion process, the synthetic resin is applied to a surface of a cut end of the core metal as well as the surface of the entire core metal.

5. The method of manufacturing the molding according to claim 1, wherein the cut-off, the removal, and the extrusion are consecutively performed while the core metal is being moved lengthwise.

6. An apparatus for manufacturing a molding comprising a core metal whose periphery is coated with a synthetic resin by extrusion and which has a varied sectional configuration, comprising:

a forming device for forming the core metal into a molded material having a uniform sectional configuration of a predetermined shape;

a cut-off device for cutting off a part of the molded material thereby forming a molded material having a varied sectional configuration; and an extruding device having an extruding die body and a movable die installed on the extruding die body.

7. The apparatus for manufacturing the molding according to claim 6, wherein a cut-off means of the cut-off device consists of a laser.

8. The apparatus for manufacturing the molding according to claim 6, wherein the molded material to be used as the core metal comprises an installing portion, an outer strip, and a ceiling portion connecting both with each other; and the cut-off device has a cut-off means for cutting off a part of the molded material to be used as the core metal such that the height of the outer strip is varied.

9. The apparatus for manufacturing the molding according to claim 6, further comprising an interlocking control connecting the cut-off device and the movable die.

* * * * *